United States Patent
Kang et al.

(10) Patent No.: US 10,863,137 B2
(45) Date of Patent: Dec. 8, 2020

(54) METHOD AND APPARATUS FOR CONTROLLING AUDIO-VIDEO CONFERENCE, DEVICE AND STORAGE MEDIUM

(71) Applicant: BEIJING BAIDU NETCOM SCIENCE AND TECHNOLOGY CO., LTD., Beijing (CN)

(72) Inventors: Jiamei Kang, Beijing (CN); Xingbiao Li, Beijing (CN); Wanqi Tang, Beijing (CN); Hanyao Shao, Beijing (CN); Yijing Zhou, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/710,597

(22) Filed: Dec. 11, 2019

(65) Prior Publication Data
US 2020/0314385 A1    Oct. 1, 2020

(30) Foreign Application Priority Data

Apr. 1, 2019   (CN) .......................... 2019 1 0258027

(51) Int. Cl.
*H04N 7/15*       (2006.01)
*H04L 29/06*      (2006.01)
*G06F 3/14*       (2006.01)

(52) U.S. Cl.
CPC ........... *H04N 7/155* (2013.01); *G06F 3/1454* (2013.01); *H04L 65/1069* (2013.01)

(58) Field of Classification Search
CPC .............. H04N 7/15; G06F 3/14; H04L 29/06
(Continued)

(56) References Cited

U.S. PATENT DOCUMENTS

| | | | |
|---|---|---|---|
| 2008/0075255 A1* | 3/2008 | Nguyen .............. | H04L 12/1818 379/202.01 |
| 2013/0127979 A1* | 5/2013 | Koh ...................... | H04M 3/567 348/14.08 |

(Continued)

FOREIGN PATENT DOCUMENTS

| | | |
|---|---|---|
| CN | 105472307 A | 4/2016 |
| CN | 108600687 A | 9/2018 |

(Continued)

*Primary Examiner* — Melur Ramakrishnaiah
(74) *Attorney, Agent, or Firm* — Knobbe, Martens, Olson & Bear LLP

(57) ABSTRACT

Embodiments of the present disclosure provide a method and apparatus for controlling an audio-video conference, a device and a storage medium. The method may include: establishing, according to a conference preparation request of an inviting party, a communication connection between a target basic audio-video device of an associated conference room and the inviting party, and enabling the inviting party to select at least one invited party; constructing a conference join request according to an invited party included in a conference initiation request of the inviting party, and sending the conference join request to the invited party; and establishing, based on a confirmation response fed back for the conference join request by the invited party, a communication connection between the invited party and the target basic audio-video device.

17 Claims, 8 Drawing Sheets

(58) Field of Classification Search
USPC .......................................... 348/14.01–14.16
See application file for complete search history.

(56) References Cited

U.S. PATENT DOCUMENTS

2014/0313282 A1* 10/2014 Ma ..................... H04N 7/141
                                                                                 348/14.09
2019/0166330 A1* 5/2019 Ma ..................... G06F 3/0482

FOREIGN PATENT DOCUMENTS

| CN | 108933673 A | 12/2018 |
| CN | 109525990 A | 3/2019 |
| JP | 2015-118648 A | 6/2015 |

* cited by examiner

METHOD AND APPARATUS FOR CONTROLLING AUDIO-VIDEO CONFERENCE, DEVICE AND STORAGE MEDIUM

CROSS-REFERENCE TO RELATED APPLICATIONS

This application claims priority to Chinese Patent Application No. 201910258027.3, filed with the China National Intellectual Property Administration (CNIPA) on Apr. 1, 2019, the contents of which are incorporated herein by reference in their entirety.

TECHNICAL FIELD

Embodiments of the present disclosure relate to the audio-video conference control technology, and specifically to a method and apparatus for controlling an audio-video conference, a device and a storage medium.

BACKGROUND

With the continuous development of communication technology, video conferences are more and more widely applied. The so-called video conference refers to a conference where users at different locations conduct a face-to-face conversation through a conference device and a communication network. Here, a remote video conference is a common conference scenario in the workplace, intended to solve the problem of remote communication through the tele-sharing through a call, a network and a video.

There are mainly two scenarios for the remote video conference: one is a video conference based on a plurality of individuals. This conference is mainly for a temporary communication, and the number of people in this conference is small. A personal terminal is generally used as a carrier, and the carrier is generally carried in an office or at home. The other one is a video conference based on a conference room. For this conference, the user generally needs to communicate in advance to make a reservation, and the number of people is large. A whole set of remote conference devices are used as a carrier, and the carrier is generally carried in the conference room having a remote conference device.

In the process of implementing the present disclosure, the inventors have discovered the following problems. Using the video call function of the instant messaging software purely for video conferencing can only realize the video communication between a plurality of individuals. When the scenario refers to the call between conference rooms, the participating and view experience of the parties participating in the conference is poor, and the situation where a speaker is not inside the camera often occurs. In addition, the ordinary conference room providing a voice call is single-purpose. Moreover, for the traditional conference room, the cost to purchase a whole set of multi-media hardware is expensive. Being affected by price and space constraints, in an enterprise, the number of conference rooms in which the video conference can be generally implemented is restricted, and thus, the reservation process is complicated and the conference scene is not flexible enough.

SUMMARY

Embodiments of the present disclosure provide a method and apparatus for controlling an audio-video conference, device and storage medium, to optimize the existing video conference controlling manner, and implement constructing a multi-parties video conference flexibly and efficiently by using a basic audio-video device.

In a first aspect, some embodiments of the present disclosure provide a method for controlling an audio-video conference, including:

establishing, according to a conference preparation request of an inviting party, a communication connection between a target basic audio-video device of an associated conference room and the inviting party, and enabling the inviting party to select at least one invited party, the inviting party including a personal terminal;

constructing a conference join request according to an invited party included in a conference initiation request of the inviting party, and sending the conference join request to the invited party, the invited party including: other conference room and/or other personal terminal; and establishing, based on a confirmation response fed back for the conference join request by the invited party, a communication connection between the invited party and the target basic audio-video device, to organize a video conference between the inviting party and the invited party for the associated conference room.

In a second aspect, some embodiments of the present disclosure provide an apparatus for controlling an audio-video conference, including:

a first communication connection establishing module, configured to establish, according to a conference preparation request of an inviting party, a communication connection between a target basic audio-video device of an associated conference room and the inviting party, and enable the inviting party to select at least one invited party, the inviting party including a personal terminal;

a conference join request constructing module, configured to construct a conference join request according to an invited party included in a conference initiation request of the inviting party, and send the conference join request to the invited party, the invited party including: other conference room and/or other personal terminal; and a second communication connection establishing module, configured to establish, based on a confirmation response fed back for the conference join request by the invited party, a communication connection between the invited party and the target basic audio-video device, to organize a video conference between the inviting party and the invited party for the associated conference room.

In a third aspect, some embodiments of the present disclosure provides a storage device, a processor and a computer program stored on the storage device and running on the processor, wherein the processor, when executing the program, implements the method for controlling an audio-video conference according to any of the embodiments of the present disclosure.

In a fourth aspect, some embodiments of the present disclosure provide a computer readable storage medium, storing a computer program, wherein the program, when executed by a processor, implements the method according to any of the embodiments of the present disclosure.

Embodiments of the present disclosure provide a method and apparatus for controlling an audio-video conference, device and storage medium. According to the conference preparation request sent by the personal terminal as the inviting party, the communication connection between the target basic audio-video device in the associated conference room and the inviting party is established, and the inviting party is enabled to select an invited party who is required to participate in the conference. After the conference join request is constructed according to the invited party included in the conference initiation request of the inviting party, the communication connection between the invited party and the target basic audio-video device is established. And thus, the new approach that the personal terminal initiates and organizes the video conference is realized, thus enabling the conference room having the simple audio-video capability to possess the capability of a remote multimedia conference, which greatly reduces the cost required to organize the video conference room. The audio-video call function of the remote multimedia conference can be realized through the personal terminal by purchasing a device having the basic audio-video capability, which makes the convocation of the conference more flexible. Thus, the technical effect that any conference room equipped with the basic audio-video device can realize the remote multimedia conference, and any personal terminal can initiate the video conference to the conference room is realized.

DETAILED DESCRIPTION OF EMBODIMENTS

Embodiments of present disclosure will be described below in detail with reference to the accompanying drawings.

It should be appreciated that the specific embodiments described herein are merely used for explaining the relevant disclosure, rather than limiting the disclosure. In addition, it should be noted that, for the ease of description, only the parts related to the relevant disclosure, not all the parts, are shown in the accompanying drawings.

It should also be noted that, for ease of description, only the parts related to the present disclosure are shown in the accompanying drawings, rather than all the contents. Before discussing the example embodiments in more detail, it should be noted that some example embodiments are described as a process or method depicted as a flowchart. Although various operations (or steps) in the flowchart are described as a sequential process, many of the operations may be implemented in parallel, concurrently or simultaneously. In addition, the sequence of the operations may be rearranged. The process may be terminated when the operations are completed, but may also have additional steps not included in the accompanying drawings. The process may correspond to a method, a function, a procedure, a subroutine, a subprogram, etc.

First Embodiment

Figure 1:
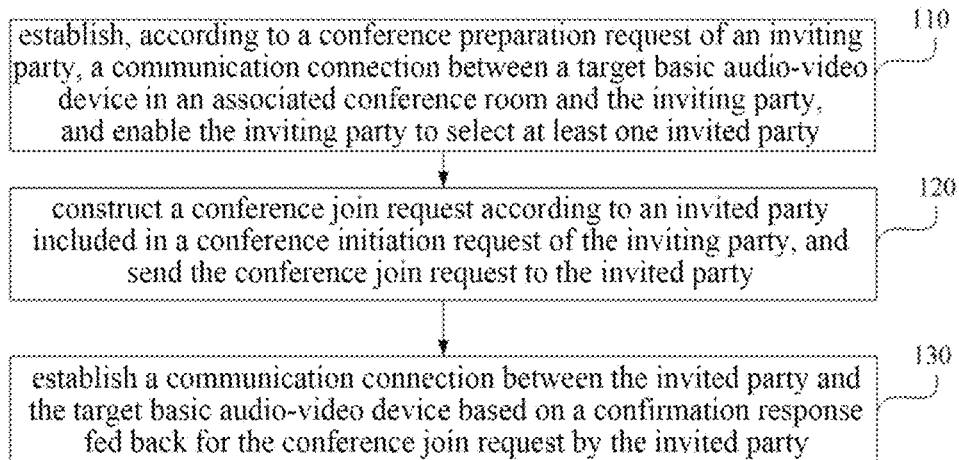
FIG. 1 is a flowchart of a method for controlling an audio-video conference in a first embodiment of the present disclosure.

FIG. 1 is a flowchart of a method for controlling an audio-video conference provided in the first embodiment of the present disclosure. This embodiment may be suitable for a situation where a personal terminal initiates and organizes a video conference performed between a basic audio-video device in a conference room and other conference room or other personal terminal. The method may be performed by an audio-video conference control apparatus provided by some embodiments of the present disclosure, and the apparatus may be implemented by means of software and/or hardware. The apparatus may be integrated into a mediation device, e.g., a smart box, connected with the basic audio-video device in the conference room, and the mediation device is generally communicated with a personal terminal in the conference room by means of a wireless connection. As shown in FIG. 1, the method in this embodiment specifically includes:

S110, establishing, according to a conference preparation request of an inviting party, a communication connection between a target basic audio-video device of an associated conference room and the inviting party, and enabling the inviting party to select at least one invited party.

In this embodiment, the inviting party refers to the initiating device initiating a video conference, and the initiating device may include a personal terminal. The personal terminal specifically refers to a smart terminal device that may be carried by a person and may connect a network for use, for example, a mobile phone, a tablet computer or a laptop.

As described above, the scheme in this embodiment of the present disclosure is mainly implemented by the mediation device. Generally, one mediation device is associated with one conference room (i.e., the associated conference room described in the embodiments of the present disclosure), and may connect to the basic audio-video device configured in the associated conference room by means of a wired connection or a wireless connection.

Here, the basic audio-video device specifically refers to a device having only a simple audio-video capability, and the basic audio-video device may include: a camera, a display screen, a microphone and a power amplifier.

In an alternative implementation of this embodiment, an application program (APP) used for matching with the mediation device may be pre-configured in the operating system of the inviting party. In addition, based on various function controls or buttons provided by this APP, the connection with the mediation device is established, or the initiated and organized video conference is controlled.

Here, the conference preparation request refers to a request that the inviting party sends to the mediation device to instruct the mediation device to enter a conference preparation stage. The request causes the mediation device to first establish the communication connection between the basic audio-video device (the target basic audio-video device) in the associated conference room and the inviting party, such that the inviting party may control a device in the target basic audio-video device, for example, the display screen, the camera or the microphone.

Typically, the inviting party may send the conference preparation request to the mediation device by scanning a code in the APP, or may send the conference preparation request to the mediation device by inputting a set access address in the APP. Alternatively, the inviting party may also send the conference preparation request to the mediation device by establishing a direct connection (e.g., a Bluetooth connection or an infrared connection) with the mediation device, which is not limited in this embodiment.

Here, after establishing the communication connection between the target basic audio-video device and the inviting party, the mediation device may enable the inviting party to select the at least one invited party, to enter a subsequent conference organization stage.

Typically, after it is determined that the communication connection between the target basic audio-video device in the associated conference room and the inviting party is successfully established, an enable signal may be sent to the APP configured in the inviting party. And after detecting the enable signal, the APP may make a display interface jump to a selection interface for a to-be-invited party, for the inviting party to select one or more invited parties.

Here, an invited party specifically refers to an invited device being invited to join the video conference. The device may refer to other conference room (typically, a basic audio-video device in the other conference room), or other personal terminal.

S120, constructing a conference join request according to an invited party included in a conference initiation request of the inviting party, and sending the conference join request to the invited party, the invited party including: other conference room and/or other personal terminal.

As described above, the manipulating user of the inviting party may select one or more invited parties through the APP configured in the inviting party, and construct, according to a pre-stored access address or a user identifier corresponding to a invited party, the conference initiation request corresponding to the invited party, and send the conference initiation request to the mediation device. After receiving the conference initiation request, the mediation device may further extract the access address or the user identifier of the invited party according to the conference initiation request, and construct the corresponding conference join request and send the conference join request to the corresponding invited party.

In this embodiment, a new approach that the personal terminal initiates the video conference and organizes the video conference with other conference room or the other personal terminal based on the basic audio-video device included in one conference room is creatively realized, it only requires the other conference room is also configured with the above mediation device, or the other personal terminal is also configured with an APP matching the mediation device, which greatly improves the efficiency and the flexibility in organizing the conference room.

S130, establishing, based on a confirmation response fed back for the conference join request by the invited party, a communication connection between the invited party and the target basic audio-video device, to organize a video conference between the inviting party and the invited party for the associated conference room.

In this embodiment, after receiving the confirmation response fed back for the conference join request by the one or more invited parties, the mediation device may further establish the communication connection between an invited party sending the confirmation response and the target basic audio-video device, and then respectively establish a communication connection between the inviting party, the target basic audio-video device and the at least one invited party, to organize the video conference in which the above parties participate.

The embodiment of the present disclosure provides a method for controlling an audio-video conference. According to the conference preparation request sent by the personal terminal as the inviting party, the communication connection between the target basic audio-video device in the associated conference room and the inviting party is established, and the inviting party is enabled to select an invited party who needs to participate in the conference. After the conference join request is constructed according to the invited party included in the conference initiation request of the inviting party, the communication connection between the invited party and the target basic audio-video device is established. And thus, the new approach that the personal terminal initiates and organizes the video conference is realized, thus enabling the conference room having the simple audio-video capability to possess the capability of a remote multimedia conference, which greatly reduces the cost required to organize the video conference room. The audio-video call function of the remote multimedia conference can be realized through the personal terminal by purchasing a device having the basic audio-video capability, which makes the convocation of the conference more flexible. Thus, the technical effect that any conference room equipped with the basic audio-video device can realize the remote multimedia conference, and any personal terminal can initiate the video conference to the conference room is realized.

Second Embodiment

Figure 2A:
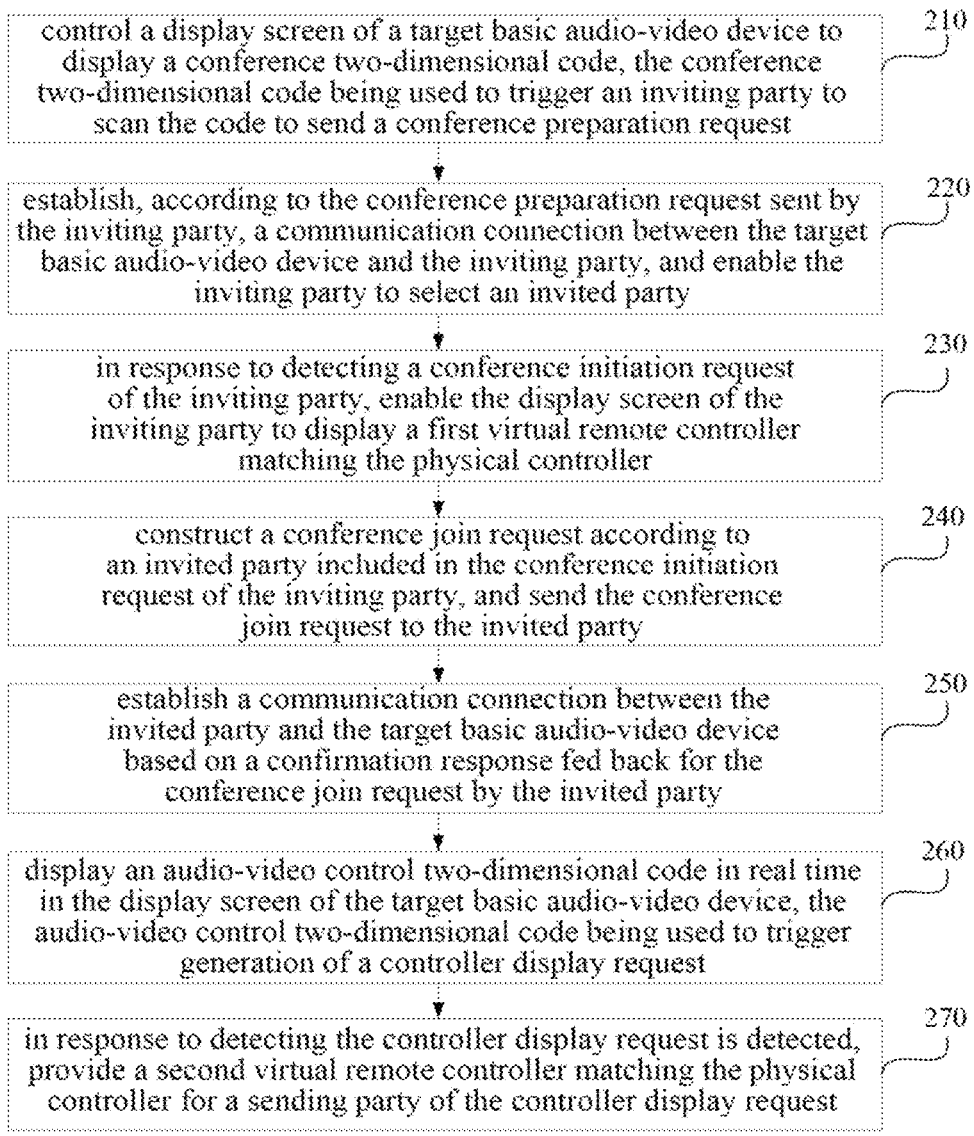
FIG. 2A is a flowchart of a method for controlling an audio-video conference in a second embodiment of the present disclosure.

FIG. 2A is a flowchart of a method for controlling an audio-video conference provided in the second embodiment of the present disclosure, and this embodiment is optimized on the basis of the above embodiment. In this embodiment, before the establishing, according to a conference preparation request of an inviting party, a communication connection between a target basic audio-video device of an associated conference room and the inviting party, the method further includes: controlling a display screen of the target basic audio-video device to display a conference two-dimensional code, the conference two-dimensional code being used to trigger the inviting party to scan the code to send the conference preparation request.

After the enabling the inviting party to select at least one invited party, the method further includes: when the conference initiation request of the inviting party is detected, enabling a display screen of the inviting party to display a first virtual remote controller matching a physical controller of the target basic audio-video device, to cause the inviting party to remotely control the target basic audio-video device through the first virtual remote controller.

After the establishing, based on a confirmation response fed back for the conference join request by the invited party, a communication connection between the invited party and the target basic audio-video device, the method further includes:

displaying an audio-video control two-dimensional code in real time in the display screen of the target basic audio-video device, the audio-video control two-dimensional code being used to trigger generation of a controller display request; and providing, when the controller display request is detected, a second virtual remote controller matching the physical controller of the target basic audio-video device for a sending party of the controller display request, to cause the sending party of the controller display request to remotely control the target basic audio-video device through the second virtual remote controller.

In addition, after the constructing a conference join request according to an invited party included in a conference initiation request of the inviting party, and the sending the conference join request to the invited party, the method further includes: prompting video conference state information in real time in the display screen of the target basic audio-video device.

Correspondingly, the method in this embodiment of the present disclosure includes:

S210, controlling a display screen of a target basic audio-video device to display a conference two-dimensional code, the conference two-dimensional code being used to trigger the inviting party to scan the code to send a conference preparation request.

In this embodiment, in order to further simplify the implementation complexity of the personal terminal initiating the video conference, the mediation device may first control the display screen of the target basic audio-video device to display one conference two-dimensional code. Generally, the conference two-dimensional code includes the access address of the mediation device.

When the personal terminal, as the inviting party, scans the conference two-dimensional code by scanning the code in the APP, the generation of one conference preparation request may be triggered, and the conference preparation request may be sent to the mediation device. Here, the conference preparation request includes the user identifier of the personal terminal, such that the mediation device establishes the communication connection between the personal terminal and the corresponding target basic audio-video device based on the user identifier.

Figure 2B:
FIG. 2b is a schematic display diagram in which a conference two-dimensional code is displayed in a display screen of a target basic audio-video device, applied in the second embodiment of the present disclosure.

Here, FIG. 2B is a schematic display diagram in which a conference two-dimensional code is displayed in a display screen of a target basic audio-video device, applied in the second embodiment of the present disclosure. As shown in FIG. 2B, the mediation device which is associated with a conference room and currently in an idle state correspondingly controls the display screen in the conference room to display a video conference two-dimensional code. When a user who needs to use the resources of the conference room observes the conference two-dimensional code on the display screen, the user may simply scan the code to initiate a video conference, and quickly organize the video conference by selecting one or more invited parties in the personal terminal.

S220, establishing, according to the conference preparation request sent by the inviting party, a communication connection between a target basic audio-video device of an associated conference room and the inviting party, and enabling the inviting party to select at least one invited party, the inviting party including a personal terminal.

Figure 2C:
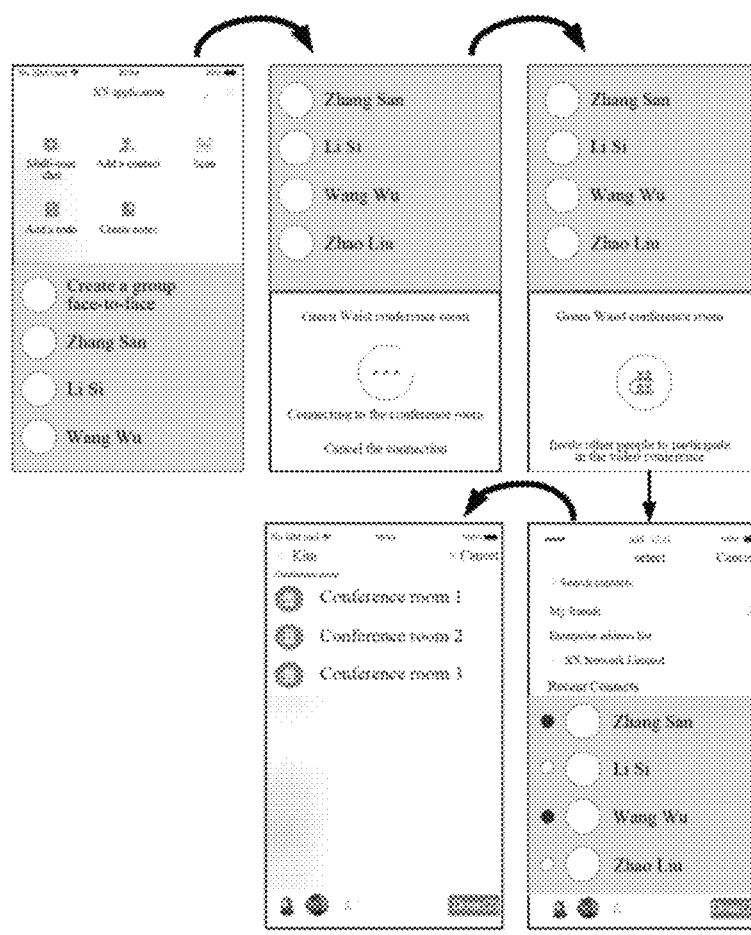
FIG. 2C is a schematic flow diagram in which an inviting party scans a code to connect to a conference room and selects at least one invited party, applied in the second embodiment of the present disclosure.

For ease of understanding, from the perspective of the inviting party (the personal terminal), FIG. 2C is a schematic flow diagram in which an inviting party scans a code to connect to a conference room and selects at least one invited party, applied in the second embodiment of the present disclosure.

As shown in FIG. 2C, the manipulating user starts "XX application" matching the mediation device by using a carried personal terminal, and scans, in the "XX application," a conference two-dimensional code displayed in the display screen of a conference room by "scanning." During the connection process implemented by scanning the code, the prompt information "connecting to the conference room" may be provided for the user through the display interface of the "XX application." After an enable signal sent by the mediation device is received, the "XX application" is enabled to select at least one invited party. For example, a control of "inviting others to participate in the video conference" is provided in a display page. After the user selects the control, one or more other personal terminals or one or more other conference rooms are provided for the user to be used as the display interface of the invited party.

Alternatively, after it is determined that the communication connection between the inviting party and the target basic audio-video device in the associated conference room is successfully established, the mediation device may feed back the conference room name of the associated conference room to the inviting party, for the inviting party to display the conference room name in the corresponding display interface of the "XX application," that is, "Green Waist conference room" shown in FIG. 2C.

S230, enabling, in response to detecting a conference initiation request of the inviting party, a display screen of the inviting party to display a first virtual remote controller matching a physical controller of the target basic audio-video device, to cause the inviting party to remotely control the target basic audio-video device through the first virtual remote controller.

Here, the first virtual remote controller is synchronized with the control content of the physical controller of the target basic audio-video device.

The display screen of the inviting party specifically refers to the display screen of the personal terminal initiating the video conference.

In an alternative implementation of this embodiment, after receiving the conference initiation request of the inviting party, the mediation device may correspondingly enable the display screen of the inviting party to display the first virtual remote controller matching the physical controller of the target basic audio-video device, to cause the inviting party to directly operate and control on the whole conference through the first virtual remote controller. For example, may increase or reduce the volume of the target basic audio-video device, and may initiate or end the video conference.

Here, the first virtual remote controller matches the physical controller of the target basic audio-video device. Typically, the physical controller may refer to Jabra teleconferencing hardware.

Alternatively, in a specific application scenario, the user in the associated conference room may also adjust the volume or start or end the conference by using the Jabra teleconferencing hardware provided by the conference room. The operation and control of the user on the Jabra teleconferencing hardware may also be synchronously fed back to the interface of the first virtual remote controller displayed by a sending party. The operation and control of the user in the interface of the first virtual remote controller may also be synchronously fed back to the Jabra teleconferencing hardware.

Figure 2D:
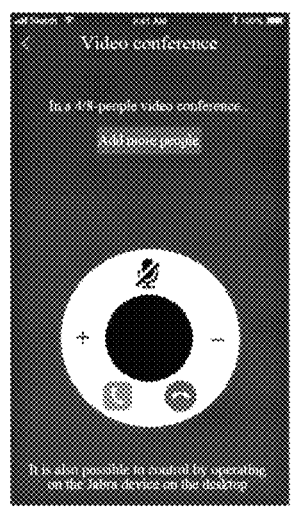
FIG. 2D is a schematic display diagram in which a first virtual remote controller matching a physical controller of the target basic audio-video device is displayed in a display screen of the inviting party, applied in the second embodiment of the present disclosure.

Here, FIG. 2D is a schematic display diagram in which a first virtual remote controller matching a physical controller of the target basic audio-video device is displayed in a display screen of the inviting party, applied in the second embodiment of the present disclosure.

Alternatively, as shown in FIG. 2D, the display screen of the inviting party may further display the current conference state (number of people entering/number of people invited), and provide an entry of "adding more people." The inviting party may re-enter the selection interface for an invited party after clicking the entry. When the number of people in the conference reaches the upper limit (e.g., 8 or 10 people), the entry of "adding more people" is closed, and the prompt at the original display position may correspondingly prompt "the number of people in the conference reaches the upper limit."

Alternatively, when the invited party includes another conference room, the another conference room is used as a participant when count the number of the people in the conference.

S240, constructing a conference join request according to an invited party included in the conference initiation request of the inviting party, and sending the conference join request to the invited party.

Here, the invited party includes other conference rooms and/or other personal terminals.

S250, establishing, based on a confirmation response fed back for the conference join request by the invited party, a communication connection between the invited party and the target basic audio-video device, to organize a video conference between the inviting party and the invited party directing at the associated conference room.

In this embodiment, during the process of constructing the conference join request based on the invited party included in the conference initiation request of the inviting party, sending the conference join request to the invited party, and waiting for the confirmation response fed back for the conference join request by the invited party, the method may further include: prompting video conference state information in real time in the display screen of the target basic audio-video device.

Alternatively, a real-time image in the associated conference room may be displayed in the display screen of the target basic audio-video device when it is detected that no invited party joins the video conference.

Figure 2E:
FIG. 2E is a schematic display diagram in which video conference state information is prompted in the display screen of the target basic audio-video device in the second embodiment of the present disclosure.

Here, FIG. 2E is a schematic display diagram in which video conference state information is prompted in the display screen of the target basic audio-video device in the second embodiment of the present disclosure. That is, when detecting that no invited party joins the video conference, the mediation device directly controls the camera of the target basic audio-video device to collect the real-time image in the associated conference room in real time, and displays, in the display screen of the target basic audio-video device, the real-time image in the associated conference room.

Further, the connection state of a tripartite video conference may be prompted at a set position in the display screen of the target basic audio-video device, for example, "the tripartite video conference being in connection."

Alternatively, when it is detected that a target invited party joins the video conference, the real-time image in the associated conference room and the real-time image corresponding to the target invited party are displayed simultaneously in the display screen of the target basic audio-video device in a set screen distribution mode.

Figure 2F:
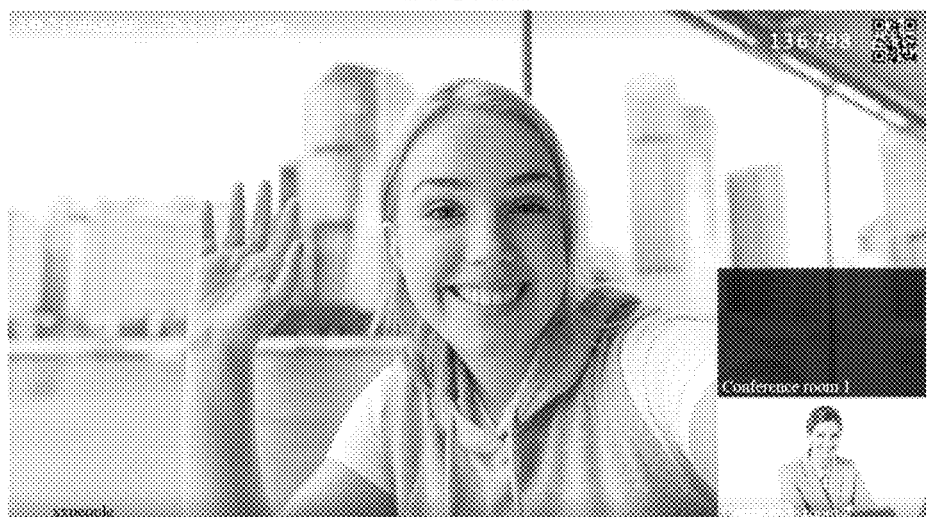
FIG. 2F is another schematic display diagram in which the video conference state information is prompted in the display screen of the target basic audio-video device in the second embodiment of the present disclosure.

Here, FIG. 2F is another schematic diagram in which the video conference state information is prompted in the display screen of the target basic audio-video device in the second embodiment of the present disclosure. That is, when detecting that a target invited party joins the video conference, the mediation device simultaneously displays the real-time image in the associated conference room and the real-time image corresponding to the target invited party.

Clearly, it may be understood that the real-time display content in the display screen of the target basic audio-video device is synchronously displayed to the invited party successfully connecting to the video conference.

S260, displaying an audio-video control two-dimensional code in real time in the display screen of the target basic audio-video device, the audio-video control two-dimensional code being used to trigger generation of a controller display request.

Here, as shown in FIG. 2F, after the establishing a communication connection between the invited party and the target basic audio-video device based on a confirmation response fed back for the conference join request by the invited party, a two-dimensional code (i.e., "the audio-video control two-dimensional code") may be displayed in real time in the display screen of the target basic audio-video device.

Correspondingly, other users other than the manipulating user of the inviting party in the associated conference room may also scan the "audio-video control two-dimensional code" through a carried personal terminal, and invoke the second virtual remote controller to remotely control the target basic audio-video device, to further enrich the approaches to controlling the video conference.

S270, providing, in response to detecting the controller display request, a second virtual remote controller matching the physical controller of the target basic audio-video device for a sending party of the controller display request, to cause the sending party of the controller display request to remotely control the target basic audio-video device through the second virtual remote controller.

Here, the second virtual remote controller is synchronized with the control content of the physical controller of the target basic audio-video device.

According to the technical solution in this embodiment of the present disclosure, the display screen of the target basic audio-video device is controlled to display the conference two-dimensional code, and the conference two-dimensional code is used to trigger the inviting party to scan the code to send the conference preparation request. Thus, the complexity of implementing that the personal terminal initiates the video conference may be further simplified. The virtual remote controller matching the physical controller of the target basic audio-video device is provided for the users in the associated conference room, which may make each user in the associated conference room control the video conference effectively, and thus, the diversity of the control on the audio-video conference is further improved. In addition, the video conference state information is prompted in real time in the target basic audio-video device, and thus, the degree of participation of all the participants in the video conference may be further improved, and the use experience of the video conference user is improved.

Third Embodiment

Figure 3A:
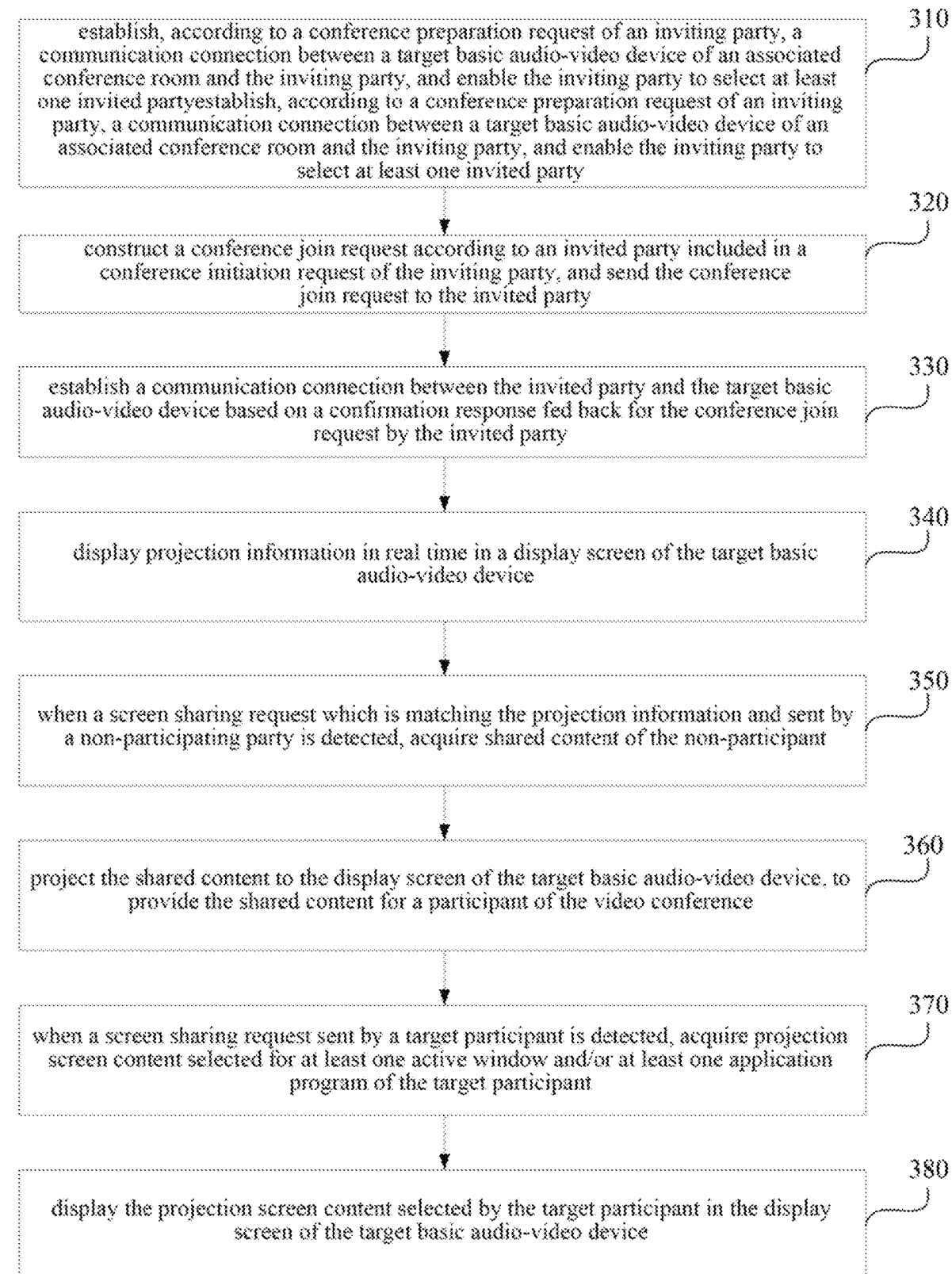
FIG. 3A is a flowchart of a method for controlling an audio-video conference in a third embodiment of the present disclosure.

FIG. 3A is a flowchart of a method for controlling an audio-video conference provided in the third embodiment of the present disclosure, and this embodiment is optimized on the basis of the above embodiments. In this embodiment, after the establishing, based on a confirmation response fed back for the conference join request by the invited party, a communication connection between the invited party and the target basic audio-video device, the method may further include: displaying wireless projection information in real time in the display screen of the target basic audio-video device; acquiring shared content of a non-participant, in response to detecting a screen sharing request matching the wireless projection information and sent by the non-participant; and projecting the shared content to the display screen of the target basic audio-video device, to provide the shared content for a participant of the video conference.

In addition, after the establishing, based on a confirmation response fed back for the conference join request by the invited party, a communication connection between the invited party and the target basic audio-video device, the method may further include: acquiring, in response to detecting a screen sharing request sent by a target participant, projection screen content selected for at least one active window and/or at least one application program of the target participant; and displaying the acquired active window and/or the acquired application program in the display screen of the target basic audio-video device, and displaying the projection content selected by the target participant in the display screen of the target basic audio-video device.

Correspondingly, the method in this embodiment may include:

S310, establishing, according to a conference preparation request of an inviting party, a communication connection between a target basic audio-video device of an associated conference room and the inviting party, and enabling the inviting party to select at least one invited party, the inviting party including a personal terminal.

S320, constructing a conference join request according to an invited party included in a conference initiation request of the inviting party, and sending the conference join request to the invited party, the invited party including: other conference rooms and/or other personal terminals.

S330, establishing, based on a confirmation response fed back for the conference join request by the invited party, a communication connection between the invited party and the target basic audio-video device, to organize a video conference between the inviting party and the invited party for the associated conference room.

S340, displaying wireless projection information in real time in a display screen of the target basic audio-video device.

In this embodiment, in order to enable the non-participant of the video conference to share information to all participants of the video conference, the wireless projection information may be displayed in real time in the display screen of the target basic audio-video device through the wireless projection technology. Typically, the wireless projection information refers to a wireless projection code (e.g., the wireless projection code "136798" displayed in the display screen of the target audio-video device in FIG. 2F).

The reason for the setting lies in that, according to the technical solution of this embodiment of the present disclosure, the inviting party may directly connect to another conference room. At this point, the conference room is added to the video conference as a participant, and all the users in the conference room are non-participant. Since the personal terminals (non-participating parties) carried by these users are not involved in the video conference, the users cannot share the corresponding information theoretically.

In this embodiment, the wireless projection information (e.g., the wireless projection code) is displayed in real time in the display screen of the target basic audio-video device, and the display content in the display screen is shared to each participant. Thus, the user in the conference room may acquire the wireless projection information, and share corresponding content based on the projection information.

S350, acquiring, in response to detecting a screen sharing request which is matching the wireless projection information and sent by a non-participant is, shared content of the non-participant.

Correspondingly, when receiving a screen sharing request including the wireless projection code and sent by the non-participant, the mediation device may correspondingly acquire the shared content of the non-participant and project the shared content to the display screen of the target basic audio-video device, to provide the shared content for the participant of the video conference.

Figure 3B:
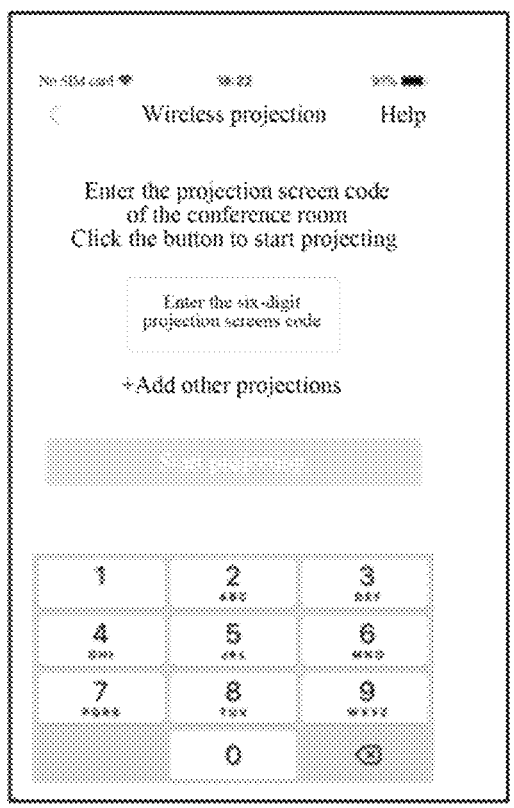
FIG. 3B is a schematic display diagram in which wireless projection information is displayed in a display screen of a non-participant, applied to the third embodiment of the present disclosure.

Here, FIG. 3B is a schematic display diagram in which wireless projection information is displayed in a display screen of a non-participant, applied to the third embodiment of the present disclosure. The schematic diagram is a schematic display diagram when the non-participant is a mobile phone. Typically, by inputting a corresponding wireless projection code through the wireless projection interface in the APP, the non-participant may send the wireless projection code to the mediation device.

Figure 3C:
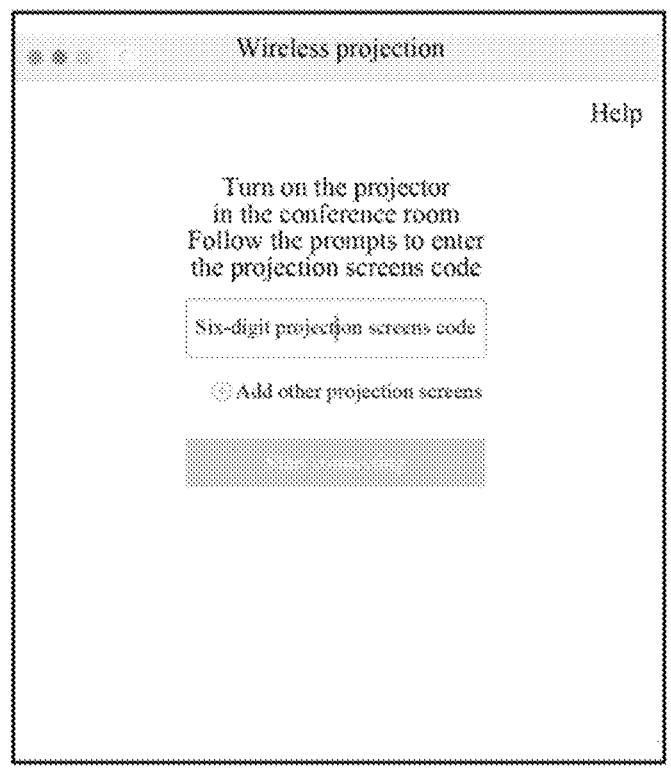
FIG. 3C is another schematic display diagram in which the wireless projection information is displayed in the display screen of the non-participant, applied to the third embodiment of the present disclosure.

Here, FIG. 3C is another schematic display diagram in which the wireless projection screen information is displayed in the display screen of the non-participant, applied to the third embodiment of the present disclosure. The schematic diagram is a schematic display diagram when the non-participant is a tablet computer or a notebook computer.

S360, projecting the shared content to the display screen of the target basic audio-video device, to provide the shared content for a participant of the video conference.

S370, acquiring, in response to detecting a screen sharing request sent by a target participant, projection content selected for at least one active window and/or at least one application program of the target participant.

In this embodiment, the personal terminal in the inviting party or the invited party of the video conference directly establishes the communication connection with the target basic audio-video device through the carried personal terminal. Thus, the personal terminal in the inviting party or the invited party of the video conference may directly send the screen sharing request to the mediation device, to request that the shared content in the personal terminal is shared in the display screen of the target basic audio-video device.

Here, the screen sharing request is generated by triggering a share control in the display screen of the target participant.

Figure 3D:
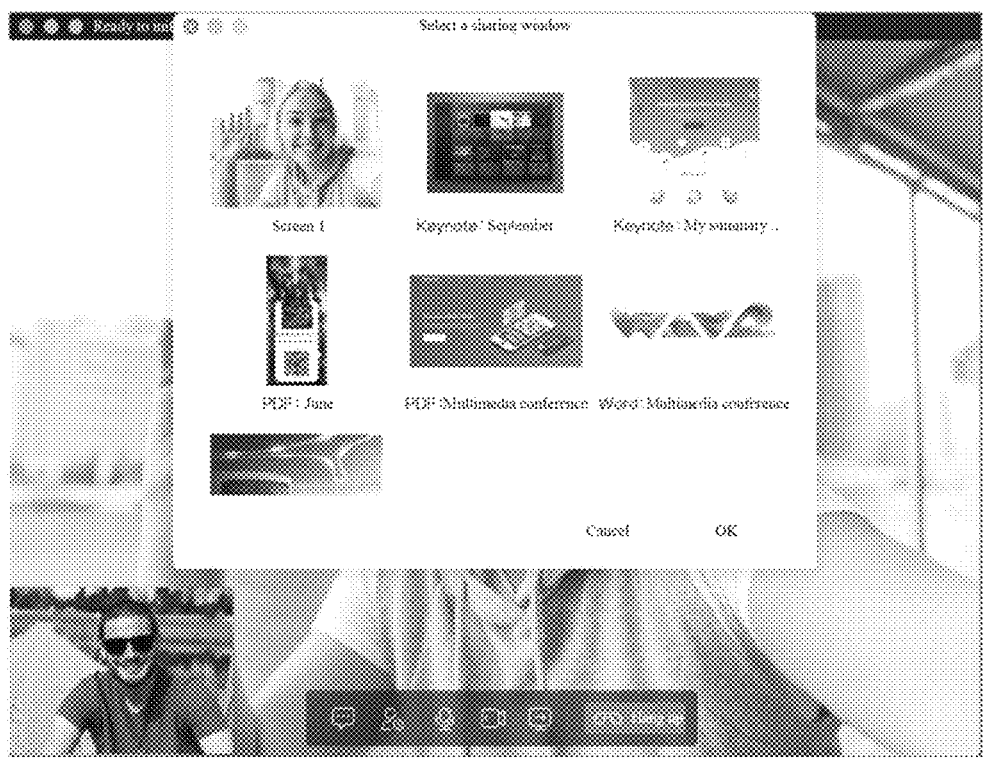
FIG. 3D is a schematic display diagram in which a selection for corresponding target shared content is prompted in a display screen of a participant, applied to the third embodiment of the present disclosure.

Here, FIG. 3D is a schematic display diagram in which a selection for corresponding target shared content is prompted in a display screen of a participant, applied to the third embodiment of the present disclosure. Here, after the manipulating user of the target participant selects the share control in the display screen of the target participant, the display screen of the target participant may correspondingly display the at least one active window and/or the at least one application program of the target participant as a candidate item for the manipulating user to select. The content selected by the manipulating user is used as the projection content.

S380, displaying the projection content selected by the target participant in the display screen of the target basic audio-video device.

Figure 3E:
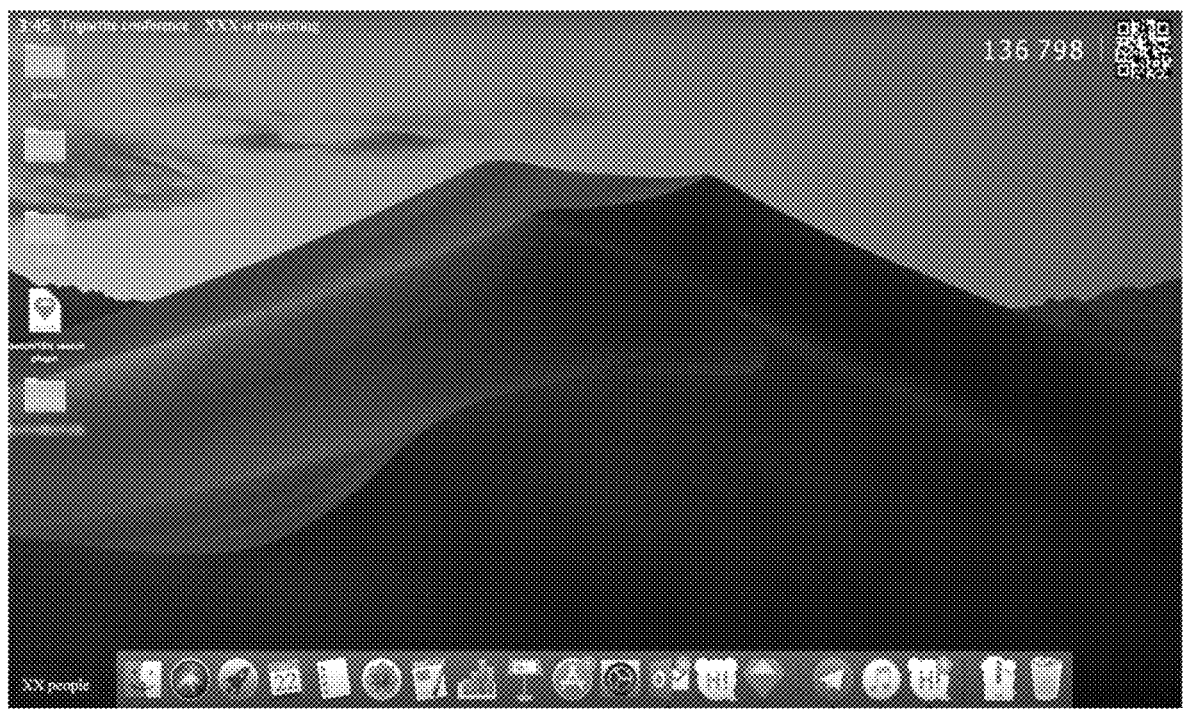
FIG. 3E is a schematic display diagram in which projection screen content is displayed in a display screen of a basic audio-video device, applied to the third embodiment of the present disclosure.

Here, FIG. 3E is a schematic display diagram in which projection content is displayed in a display screen of a basic audio-video device, applied to the third embodiment of the present disclosure.

According to the technical solution of this embodiment of the present disclosure, the wireless projection information is displayed in real time in the display screen of the target basic audio-video device, and when the screen sharing request which is matching the wireless projection information and sent by the non-participant is detected, the manner in which the shared content of the non-participant will be shared in the display screen of video conference is acquired. Thus, other non-participants other than the participants of the video conference can project the content in their carried personal terminals to the video conference to share the content, which expands the applicable scenarios of the video conference, and further optimizes the form of controlling the video conference, thus greatly satisfying the use experience of the user in the video conference.

On the basis of the above embodiments, the method may further include:

displaying, according to a conference join request of the other conference room, identifier of an inviting party corresponding to the conference join request and a connection mode in the display screen of the target basic audio-video device.

The connection mode is used to indicate that the user in the associated conference room organizes the video conference with a user in the other conference room through the connection mode.

Figure 3F:
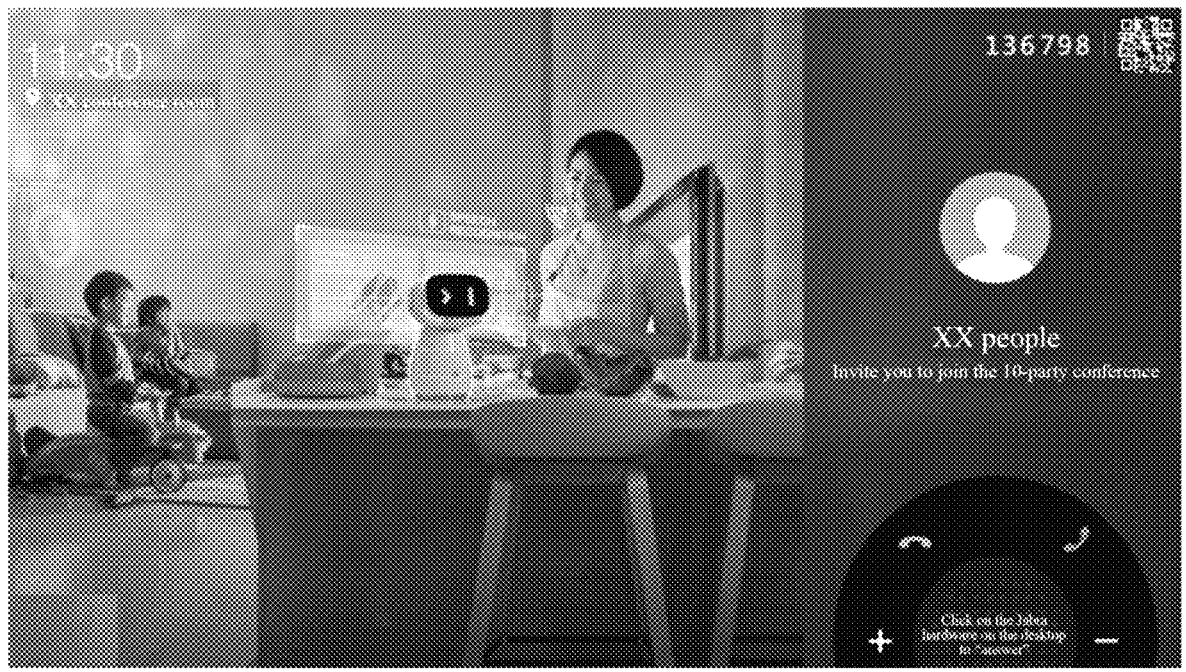
FIG. 3F is a schematic display diagram in which relevant information of a conference join request is displayed in the display screen of the basic audio-video device, applied to the third embodiment of the present disclosure.

Here, FIG. 3F is a schematic display diagram in which relevant information of a conference join request is displayed in the display screen of the basic audio-video device, applied to the third embodiment of the present disclosure. Through the above settings, the basic audio-video device in one conference room may be used as the invited party to receive the invitations from the other personal terminals and access the video conference, besides being used as the relevant device of the inviting party to connect to the other conference rooms or the other personal terminals.

Fourth Embodiment

Figure 4:
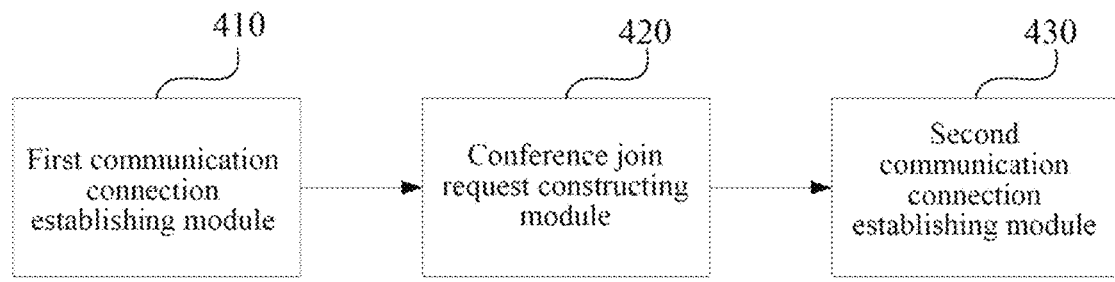
FIG. 4 is a structural diagram of an apparatus for controlling an audio-video conference in a fourth embodiment of the present disclosure.

FIG. 4 is a schematic structural diagram of an apparatus for controlling an audio-video conference provided in the fourth embodiment of the present disclosure. As shown in FIG. 4, the apparatus includes: a first communication connection establishing module 410, a conference join request constructing module 420, and a second communication connection establishing module 430.

The first communication connection establishing module 410 is configured to establish, according to a conference preparation request of an inviting party, a communication connection between a target basic audio-video device of an associated conference room and the inviting party, and enable the inviting party to select at least one invited party, the inviting party including a personal terminal.

The conference join request constructing module 420 is configured to construct a conference join request according to an invited party included in a conference initiation request of the inviting party, and send the conference join request to the invited party, the invited party including: other conference room and/or other mobile terminal.

The second communication connection establishing module 430 is configured to establish, based on a confirmation response fed back for the conference join request by the invited party, a communication connection between the invited party and the target basic audio-video device, to organize a video conference between the inviting party and the invited party for the associated conference room.

The embodiment of the present disclosure provides the apparatus for controlling an audio-video conference. According to the conference preparation request sent by the personal terminal as the inviting party, the communication connection between the target basic audio-video device in the associated conference room and the inviting party is established, and the inviting party is enabled to select an invited party who is required to participate in the conference. After the conference join request is constructed according to the invited party included in the conference initiation request of the inviting party, the communication connection between the invited party and the target basic audio-video device is established. And thus, the new approach that the personal terminal initiates and organizes the video conference is realized, thus enabling the conference room having the simple audio-video capability to possess the capability of a remote multimedia conference, which greatly reduces the cost required to organize the video conference room. The audio-video call function of the remote multimedia conference can be realized through the personal terminal by purchasing a device having the basic audio-video capability, which makes the convocation of the conference more flexible. Thus, the technical effect that any conference room equipped with the basic audio-video device can realize the remote multimedia conference, and any personal terminal can initiate the video conference to the conference room is realized.

On the basis of the above embodiments, the apparatus may further include: a first projection screen processing module, configured to display, after the communication connection between the invited party and the target basic audio-video device is established based on the confirmation response fed back for the conference join request by the invited party, wireless projection information in real time in a display screen of the target basic audio-video device;

acquire shared content of a non-participant, in response to detecting a screen sharing request matching the wireless projection screen information and sent by a non-participant; and project the shared content to the display screen of the target basic audio-video device, to provide the shared content for a participant of the video conference.

On the basis of the above embodiments, the apparatus may further include: a second projection screen processing module, configured to acquire, in response to detecting a screen sharing request sent by a target participant, projection screen content selected for at least one active window and/or at least one application program of the target participant; and display the projection screen content selected by the target participant in the display screen of the target basic audio-video device.

Here, the screen sharing request is generated by triggering a sharing control in a display screen of the target participant.

On the basis of the above embodiments, the apparatus may further include: a conference two-dimensional code displaying module, configured to control, before the communication connection between the target basic audio-video device of the associated conference room and the inviting party is established based on the conference preparation request of the inviting party, the display screen of the target basic audio-video device to display a conference two-dimensional code, the conference two-dimensional code being used to trigger the inviting party to scan the code to send the conference preparation request.

On the basis of the above embodiments, the apparatus may further include: a first virtual remote controller enabling module, configured to enable, after the inviting party is enabled to select the at least one invited party, a display screen of the inviting party to display a first virtual remote controller matching a physical controller of the target basic audio-video device in response to detecting the conference initiation request of the inviting party, to cause the inviting party to remotely control the target basic audio-video device through the first virtual remote controller.

Here, the first virtual remote controller is synchronized with control content of the physical controller of the target basic audio-video device.

On the basis of the above embodiments, the apparatus may further include: a second virtual remote controller enabling module, configured to display, after the communication connection between the invited party and the target basic audio-video device is established based on the confirmation response fed back for the conference join request by the invited party, an audio-video control two-dimensional code in real time in the display screen of the target basic audio-video device, the audio-video control two-dimensional code being used to trigger generation of a controller display request; and provide, in response to detecting the controller display request, a second virtual remote controller matching the physical controller of the target basic audio-video device for a sending party of the controller display request, to cause the sending party of the controller display request to remotely control the target basic audio-video device through the second virtual remote controller.

Here, the second virtual remote controller is synchronized with the control content of the physical controller of the target basic audio-video device.

On the basis of the above embodiments, the apparatus may further include: a video conference state prompting module, configured to prompt, after the conference join request is constructed according to the invited party included in the conference initiation request of the inviting party and is sent to the invited party, video conference state information in real time in the display screen of the target basic audio-video device.

On the basis of the above embodiments, the video conference state prompting module may be configured to:

display, in response to detecting that no invited party joins the video conference, a real-time image in the associated conference room in the display screen of the target basic audio-video device; and display, in response to detecting that a target invited party joins the video conference, the real-time image in the associated conference room and a real-time image corresponding to the target invited party simultaneously in the display screen of the target basic audio-video device in a set screen distribution mode.

On the basis of the above embodiments, the apparatus may further include: a video conference joining module, configured to display, according to a conference join request of the other conference rooms, identifier information of an inviting party corresponding to the conference join request and a connection mode in the display screen of the target basic audio-video device.

Here, the connection mode is used to indicate that a user in the associated conference room organizes the video conference with a user in the other conference room through the connection mode.

The apparatus for controlling an audio-video conference may perform the method for controlling an audio-video conference provided by any of the embodiments of the present disclosure, and possess functional modules for performing the method for controlling an audio-video conference and corresponding beneficial effects.

Fifth Embodiment

Figure 5:
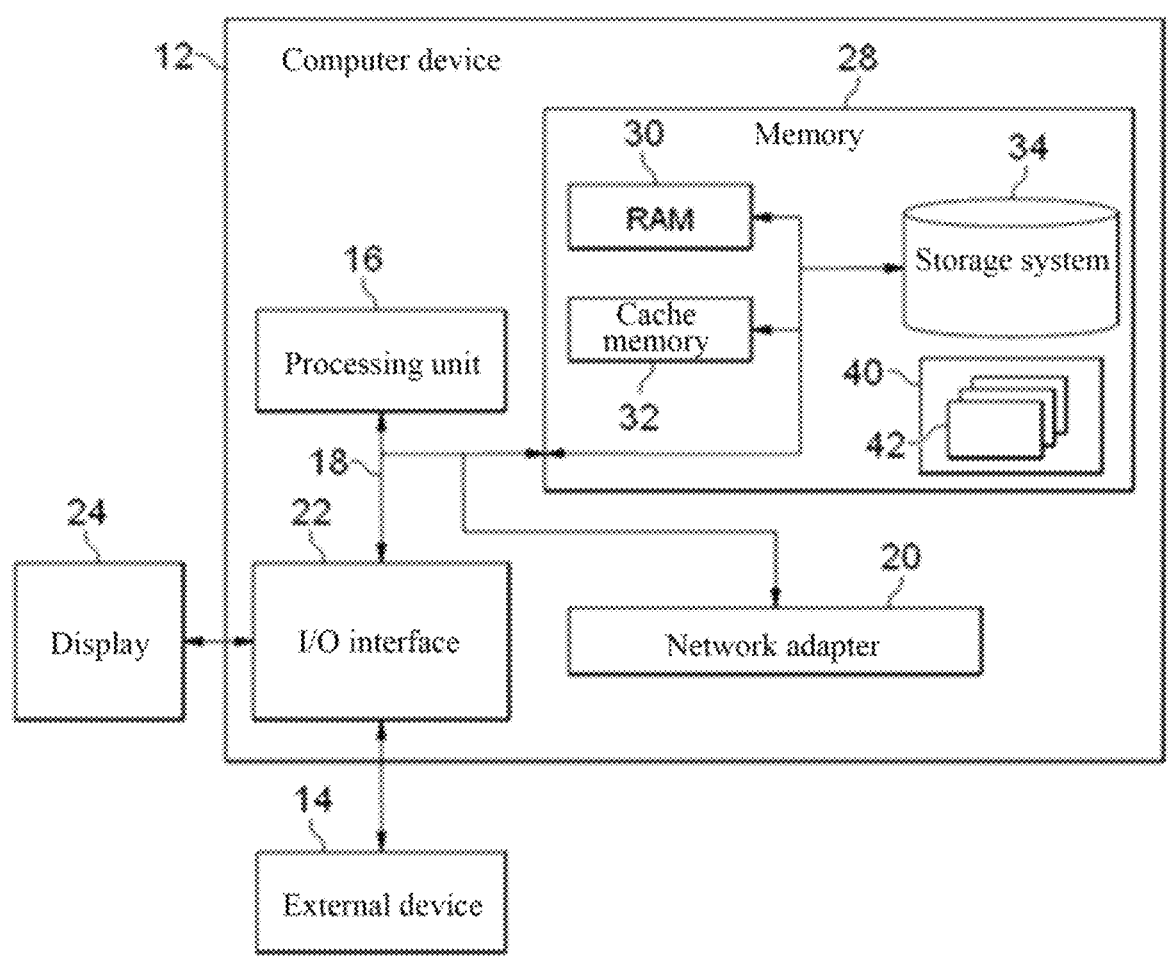
FIG. 5 is a schematic structural diagram of a computer device in a fifth embodiment of the present disclosure.

FIG. 5 is a schematic structural diagram of a computer device provided in the fifth embodiment of the present disclosure. FIG. 5 is a block diagram of an example computer device 12 applicable to implement some embodiments of the present disclosure. The computer device 12 shown in FIG. 5 is merely an example, and should not bring any limitations to the functions and the scope of use of the embodiments of the present disclosure.

As shown in FIG. 5, the computer device 12 is expressed in the form of a general purpose computing device. Components of the computer device 12 may include, but not limited to, one or more processors or processing units 16, a system memory 28, and a bus 18 connecting different system components (including the system memory 28 and the processing units 16).

The bus 18 represents one or more of bus structures, including a memory bus or a memory controller, a peripheral bus, a graphics acceleration port, a processor, or a local bus using any of a variety of bus structures. By way of example, the system structures include, but are not limited to, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer device 12 typically includes a variety of computer system readable media. These medias may be any available media that can be accessed by the computer device 12, including volatile and non-volatile media, and removable and non-removable media.

The system memory 28 may include a computer system readable medium in the form of a volatile memory, such as a random access memory (RAM) 30 and/or a cache memory 32. The computer device 12 may further include other removable/non-removable, volatile/non-volatile computer system storage media. By way of example only, a storage system 34 may be used to read from and write in a non-removable and non-volatile magnetic media (not shown in FIG. 5, usually known as a "hard drive"). Although not shown in FIG. 5, a magnetic disk drive for reading from and writing in a removable non-volatile disk (e.g., a "floppy disk"), and an optical disk drive for reading from or writing in a removable non-volatile optical disk (e.g., a CD-ROM, a DVD-ROM or other optical media) may be provided. With such arrangements, each driver may be connected to the bus 18 through one or more data media interfaces. The memory 28 may include at least one program product, the program product has a set of program modules (e.g., at least one program module) configured to execute the functions of embodiments of the present disclosure.

A program/utility tool 40 with a set of (at least one) program module X42 may be stored in, e.g., the memory X28. The program module X42 includes, but is not limited to, an operating system, one or more applications, other program modules, and program data. Each of these examples or some combination thereof may include implementation of a network environment. The program modules 42 usually executes the functions and/or methods according to the embodiments of the disclosure.

The computer device 12 may also communicate with one or more external devices 14 such as a keyboard, a pointing device and a display 24, and may also communicate with one or more devices that enable a user to interact with the computer device 12, and/or communicates with any other device (e.g., a network card and a modem) that enables the computer device 12 to communicate with one or more of other computing devices. Such communication may be implemented via an input/output (I/O) interface 22. In addition, the computer device 12 may also communicate with one or more networks such as a local area network (LAN), a wide area network (WAN), and/or a public network (e.g., the Internet) via a network adapter 20. As shown in the figures, the network adapter 20 communicates with other modules of the computer device 12 via the bus 18. It should be understood that, although not shown in FIG. 5, other hardware and/or software modules may be used in combination with the computer device 12, including but not limited to: a microcode, a device driver, a redundancy processing unit, an external disk drive array, a RAID system, a tape drive, and a data backup storage system.

By running the program stored in the system memory 28, the processing units 16 executes various functional applications and performs data processing, for example, the method for controlling an audio-video conference provided by any of the embodiments of the present disclosure.

That is, the processing units 16, when executing the program, implement: establishing, according to a conference preparation request of an inviting party, a communication connection between a target basic audio-video device of an associated conference room and the inviting party, and enabling the inviting party to select at least one invited party, the inviting party including a personal terminal;

constructing a conference join request according to an invited party included in a conference initiation request of the inviting party, and sending the conference join request to the invited party, the invited party including: other conference room and/or other personal terminal; and establishing, based on a confirmation response fed back for the conference join request by the invited party, a communication connection between the invited party and the target basic audio-video device, a communication connection between the invited party and the target basic audio-video device, to organize a video conference between the inviting party and the invited party for the associated conference room.

Sixth Embodiment

The sixth embodiment of the present disclosure provides a computer readable storage medium storing a computer program, and the program, when executed by a processor, implements the method for controlling an audio-video conference as provided by any of the embodiments in the present application.

That is, the program, when executed by the processor, implements: establishing, according to a conference preparation request of an inviting party, a communication connection between a target basic audio-video device of an associated conference room and the inviting party, and enabling the inviting party to select at least one invited party, the inviting party including a personal terminal;

constructing a conference join request according to an invited party included in a conference initiation request of the inviting party, and sending the conference join request to the invited party, the invited party including: other conference room and/or other personal terminal; and establishing, based on a confirmation response fed back for the conference join request by the invited party, a communication connection between the invited party and the target basic audio-video device, to organize a video conference between the inviting party and the invited party for the associated conference room.

The computer storage medium of the embodiments of the present disclosure may use any combination of one or more computer readable mediums. The computer readable medium may be a computer readable signal medium or a computer readable storage medium. The computer readable storage medium may be, for example, but not limited to, electric, magnetic, optical, electromagnetic, infrared, or semiconductor systems, apparatus, elements, or a combination of any of the above. A more specific example (non-exhaustive list) of the computer readable storage medium may include but is not limited to: electrical connection with one or more wires, a portable computer disk, a hard disk, a RAM, a read only memory (ROM), an erasable programmable read only memory (EPROM), a flash memory, a fiber, a portable CD-ROM, an optical memory, a magnet memory or any suitable combination of the above. The computer readable storage medium herein may be any tangible medium containing or storing programs which may be used by a command execution system, apparatus or element or incorporated thereto.

The computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element.

The program codes contained on the computer readable medium may be transmitted with any suitable medium including but not limited to: wireless, wired, optical cable, radiofrequency (RF) etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server.

In the circumstance involving a remote computer, the remote computer may be connected to a user's computer through any network, including LAN or WAN, or may be connected to an external computer (for example, connected through Internet using an Internet service provider).

It should be noted that the above are only the preferred embodiments of the present disclosure and the technical principles applied. It should be appreciated by those skilled in the art that the present disclosure is not limited to the specific embodiments described herein, and that various modifications, changes and substitutions may be made without departing from the scope of the present disclosure. Although the present disclosure has been described in detail through the above embodiments, the present disclosure is not limited to the above embodiments, other equivalent embodiments may be included without departing from the inventive concept, and the scope of the disclosure is determined by the scope of the appended claims.

What is claimed is:

1. A method for controlling an audio-video conference, comprising:
   establishing, according to a conference preparation request of an inviting party, a communication connection between a target basic audio-video device of an associated conference room and the inviting party, and enabling the inviting party to select at least one invited party, the inviting party including a personal terminal;
   constructing a conference join request according to an invited party included in a conference initiation request of the inviting party, and sending the conference join request to the invited party, the invited party including: other conference room and/or other personal terminal;
   establishing, based on a confirmation response fed back for the conference join request by the invited party, a communication connection between the invited party and the target basic audio-video device, to organize a video conference between the inviting party and the invited party for the associated conference room;
   displaying wireless projection information in real time in a display screen of the target basic audio-video device;
   acquiring shared content of a non-participant of the video conference, in response to detecting a screen sharing request matching the wireless projection information and sent by the non-participant of the video conference; and
   projecting the shared content of the non-participant of the video conference to the display screen of the target basic audio-video device, to provide the shared content for a participant of the video conference.

2. The method according to claim 1, wherein, after the establishing, based on a confirmation response fed back for the conference join request by the invited party, a communication connection between the invited party and the target basic audio-video device, the method further comprises:
   acquiring, in response to detecting a screen sharing request sent by a target participant, projection screen content selected for at least one active window and/or at least one application program of the target participant; and
   displaying the projection screen content selected by the target participant in the display screen of the target basic audio-video device,
   wherein the screen sharing request is generated by triggering a sharing control in a display screen of the target participant.

3. The method according to claim 1, wherein, before the establishing, according to a conference preparation request of an inviting party, a communication connection between a target basic audio-video device of an associated conference room and the inviting party, the method further comprises:
   controlling the display screen of the target basic audio-video device to display a conference two-dimensional code, the conference two-dimensional code being used to trigger the inviting party to scan the code to send the conference preparation request.

4. The method according to claim 1, wherein, after the enabling the inviting party to select at least one invited party, the method further comprises:
   enabling, in response to detecting the conference initiation request of the inviting party, a display screen of the inviting party to display a first virtual remote controller matching a physical controller of the target basic audio-video device, to cause the inviting party to remotely control the target basic audio-video device through the first virtual remote controller,
   wherein, the first virtual remote controller is synchronized with control content of the physical controller of the target basic audio-video device.

5. The method according to claim 1, wherein, after the establishing, based on a confirmation response fed back for the conference join request by the invited party, a communication connection between the invited party and the target basic audio-video device, the method further comprises:
   displaying an audio-video control two-dimensional code in real time in the display screen of the target basic audio-video device, the audio-video control two-dimensional code being used to trigger generation of a controller display request; and
   providing, in response to detecting the controller display request, a second virtual remote controller matching the physical controller of the target basic audio-video device for a sending party of the controller display request, to cause the sending party of the controller display request to remotely control the target basic audio-video device through the second virtual remote controller,
   wherein, the second virtual remote controller is synchronized with the control content of the physical controller of the target basic audio-video device.

6. The method according to claim 1, wherein, after the constructing a conference join request according to an invited party included in a conference initiation request of the inviting party, and the sending the conference join request to the invited party, the method further comprises:
   prompting video conference state information in real time in the display screen of the target basic audio-video device.

7. The method according to claim 6, wherein the prompting video conference state information in real time in the display screen of the target basic audio-video device includes:
   displaying, in response to detecting that no invited party joins the video conference, a real-time image in the associated conference room in the display screen of the target basic audio-video device; and displaying, in response to detecting that a target invited party joins the video conference, the real-time image in the associated conference room and a real-time image corresponding to the target invited party simultaneously in the display screen of the target basic audio-video device in a set screen distribution mode.

8. The method according to claim 1, further comprising:
displaying, according to a conference join request of other conference room, identifier information of an inviting party corresponding to the conference join request and a connection mode in the display screen of the target basic audio-video device,
wherein the connection mode is used to indicate that a user in the associated conference room organizes the video conference with a user in the other conference room through the connection mode.

9. An apparatus for controlling an audio-video conference, comprising:
at least one processor; and
a memory storing instructions, the instructions when executed by the at least one processor, cause the at least one processor to perform operations, the operations comprising:
establishing, according to a conference preparation request of an inviting party, a communication connection between a target basic audio-video device of an associated conference room and the inviting party, and enabling the inviting party to select at least one invited party, the inviting party including a personal terminal;
constructing a conference join request according to an invited party included in a conference initiation request of the inviting party, and sending the conference join request to the invited party, the invited party including: other conference room and/or other personal terminal;
establishing, based on a confirmation response fed back for the conference join request by the invited party, a communication connection between the invited party and the target basic audio-video device, to organize a video conference between the inviting party and the invited party for the associated conference room;
displaying wireless projection information in real time in a display screen of the target basic audio-video device;
acquiring shared content of a non-participant of the video conference, in response to detecting a screen sharing request matching the wireless projection information and sent by the non-participant of the video conference; and
projecting the shared content of the non-participant of the video conference to the display screen of the target basic audio-video device, to provide the shared content for a participant of the video conference.

10. The apparatus according to claim 9, wherein after the establishing, based on a confirmation response fed back for the conference join request by the invited party, a communication connection between the invited party and the target basic audio-video device, the operations further comprise:
acquiring, in response to detecting a screen sharing request sent by a target participant, projection screen content selected for at least one active window and/or at least one application program of the target participant; and
displaying the projection screen content selected by the target participant in the display screen of the target basic audio-video device,
wherein the screen sharing request is generated by triggering a sharing control in a display screen of the target participant.

11. The apparatus according to claim 9, wherein before the establishing, according to a conference preparation request of an inviting party, a communication connection between a target basic audio-video device of an associated conference room and the inviting party, the operations further comprise:
controlling the display screen of the target basic audio-video device to display a conference two-dimensional code, the conference two-dimensional code being used to trigger the inviting party to scan the code to send the conference preparation request.

12. The apparatus according to claim 9, wherein after the enabling the inviting party to select at least one invited party, the operations further comprise:
enabling, in response to detecting the conference initiation request of the inviting party, a display screen of the inviting party to display a first virtual remote controller matching a physical controller of the target basic audio-video device, to cause the inviting party to remotely control the target basic audio-video device through the first virtual remote controller,
wherein, the first virtual remote controller is synchronized with control content of the physical controller of the target basic audio-video device.

13. The apparatus according to claim 9, wherein after the establishing, based on a confirmation response fed back for the conference join request by the invited party, a communication connection between the invited party and the target basic audio-video device, the operations further comprise:
displaying an audio-video control two-dimensional code in real time in the display screen of the target basic audio-video device, the audio-video control two-dimensional code being used to trigger generation of a controller display request; and
providing, in response to detecting the controller display request, a second virtual remote controller matching the physical controller of the target basic audio-video device for a sending party of the controller display request, to cause the sending party of the controller display request to remotely control the target basic audio-video device through the second virtual remote controller,
wherein, the second virtual remote controller is synchronized with the control content of the physical controller of the target basic audio-video device.

14. The apparatus according to claim 9, wherein after the constructing a conference join request according to an invited party included in a conference initiation request of the inviting party, and the sending the conference join request to the invited party, the operations further comprise:
prompting video conference state information in real time in the display screen of the target basic audio-video device.

15. The apparatus according to claim 14, wherein the prompting video conference state information in real time in the display screen of the target basic audio-video device includes:
displaying, in response to detecting that no invited party joins the video conference, a real-time image in the associated conference room in the display screen of the target basic audio-video device; and
displaying, in response to detecting that a target invited party joins the video conference, the real-time image in the associated conference room and a real-time image corresponding to the target invited party simultaneously in the display screen of the target basic audio-video device in a set screen distribution mode.

16. The apparatus according to claim 9, wherein the operations further comprise:
- displaying, according to a conference join request of other conference room, identifier information of an inviting party corresponding to the conference join request and a connection mode in the display screen of the target basic audio-video device,
- wherein the connection mode is used to indicate that a user in the associated conference room organizes the video conference with a user in the other conference room through the connection mode.

17. A non-transitory computer readable storage medium, storing a computer program, wherein the program, when executed by a processor, causes the processor to implement operations comprising:
- establishing, according to a conference preparation request of an inviting party, a communication connection between a target basic audio-video device of an associated conference room and the inviting party, and enabling the inviting party to select at least one invited party, the inviting party including a personal terminal;
- constructing a conference join request according to an invited party included in a conference initiation request of the inviting party, and sending the conference join request to the invited party, the invited party including: other conference room and/or other personal terminal;
- establishing, based on a confirmation response fed back for the conference join request by the invited party, a communication connection between the invited party and the target basic audio-video device, to organize a video conference between the inviting party and the invited party for the associated conference room;
- displaying wireless projection information in real time in a display screen of the target basic audio-video device;
- acquiring shared content of a non-participant of the video conference, in response to detecting a screen sharing request matching the wireless projection information and sent by the non-participant of the video conference; and
- projecting the shared content of the non-participant of the video conference to the display screen of the target basic audio-video device, to provide the shared content for a participant of the video conference.

\* \* \* \* \*